United States Patent Office 3,532,547
Patented Oct. 6, 1970

3,532,547
PROCESS FOR SUPPLYING HYDROGEN AND
OXYGEN TO FUEL CELLS
Nathan P. Vahldieck, Snyder, and Ladislas C. Matsch,
Eggertsville, N.Y., assignors to Union Carbide Corporation, a corporation of New York
Filed June 10, 1965, Ser. No. 462,897
Int. Cl. H01m 27/14
U.S. Cl. 136—86                                         2 Claims

ABSTRACT OF THE DISCLOSURE

A process for operating a hydrogen-oxygen fuel cell in a closed system, hydrogen being obtained by dissociation of a hydrogen-containing compound and oxygen being obtained from a liquid oxygen supply. Oxygen is used to burn various waste products. The resulting heat is used in the dissociation of the hydrogen-containing compound and the refrigeration value of oxygen and/or the hydrogen-containing compound is used to condense combustion products and other by-product materials.

---

Figure 1:
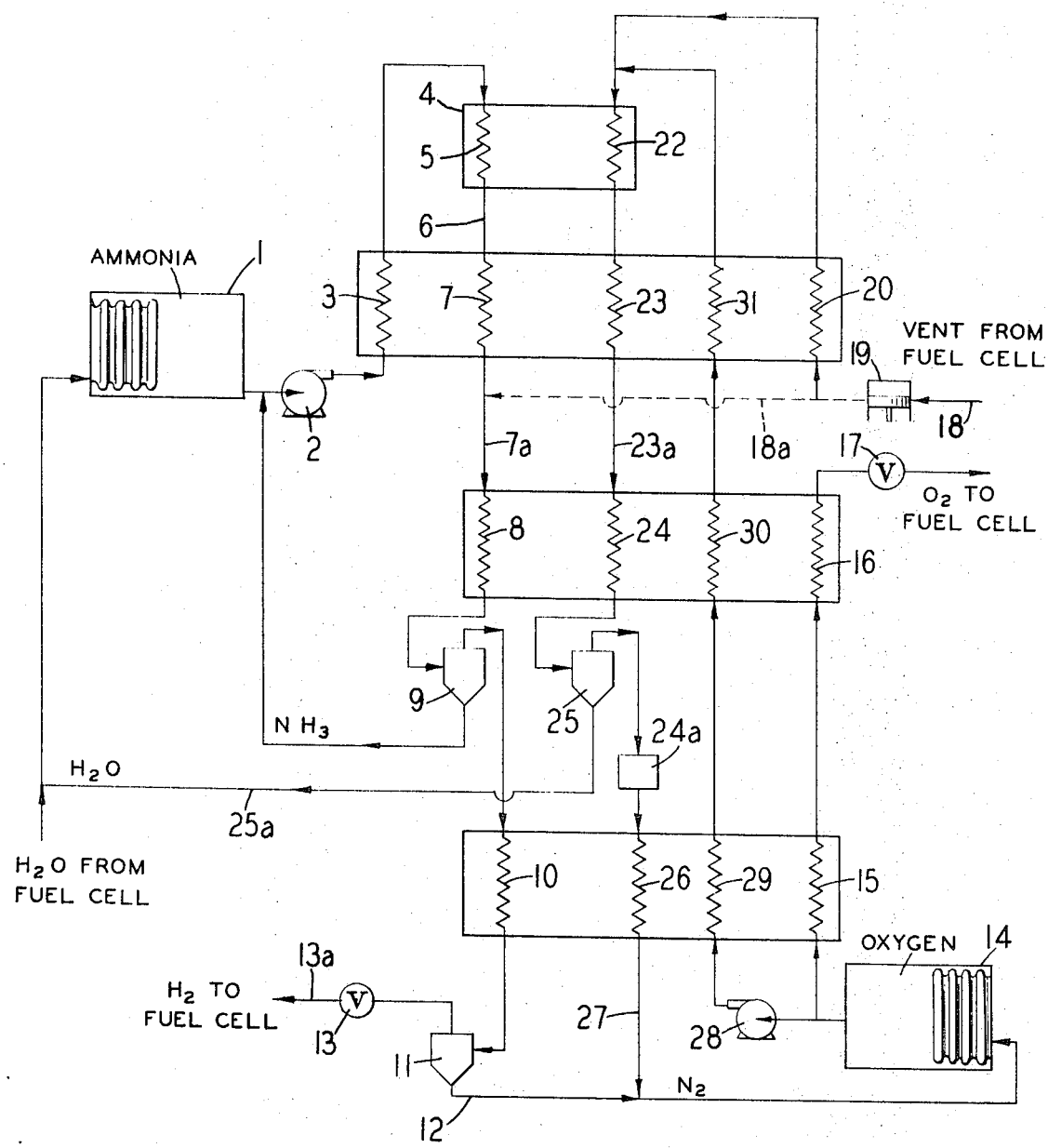

This invention relates to fuel cells. More particularly, the invention is directed to a process for providing separate streams of hydrogen and oxygen to serve, respectively, as fuel and oxidant in a fuel cell system.

Fuel cells have been known for many years. It has nearly always been relatively easy to use high purity liquid oxygen as a source of oxygen gas for use in fuel cells. However, it has not always been feasible to provide hydrogen in the same manner. In many applications, hydrogen is more conveniently generated on the site for fuel cell use by the decomposition of hydrogen-containing compounds. A disadvantage of this method of providing hydrogen, however, is that normal operation results in a waste gas stream which contains an appreciable amount of hydrogen. In fuel cell facilities designed to operate on a small scale or in a compact or an enclosed space, this waste hydrogen cannot be readily recovered, and sometimes its disposition presents problems of economy and safety.

Accordingly, it is an object of the present invention to provide a novel process for producing separate streams of gaseous oxygen and hydrogen for fuel cells using as starting materials liquid oxygen and a hydrogen-containing compound. A further object is to provide a process in which the heating value of the hydrogen waste stream from the fuel cell is utilized efficiently and in which such waste stream utilization converts the components of the waste stream to easily disposable forms. A still further object of the invention is to provide a process for supplying gaseous hydrogen and oxygen for fuel cell use in which the refrigeration value of liquid oxygen is utilized in the disposition of the waste product stream. A still further object of the invention is to provide a process for supplying hydrogen and oxygen to a fuel cell which process operates safely and efficiently in a compact and/or enclosed space.

Figure 2:
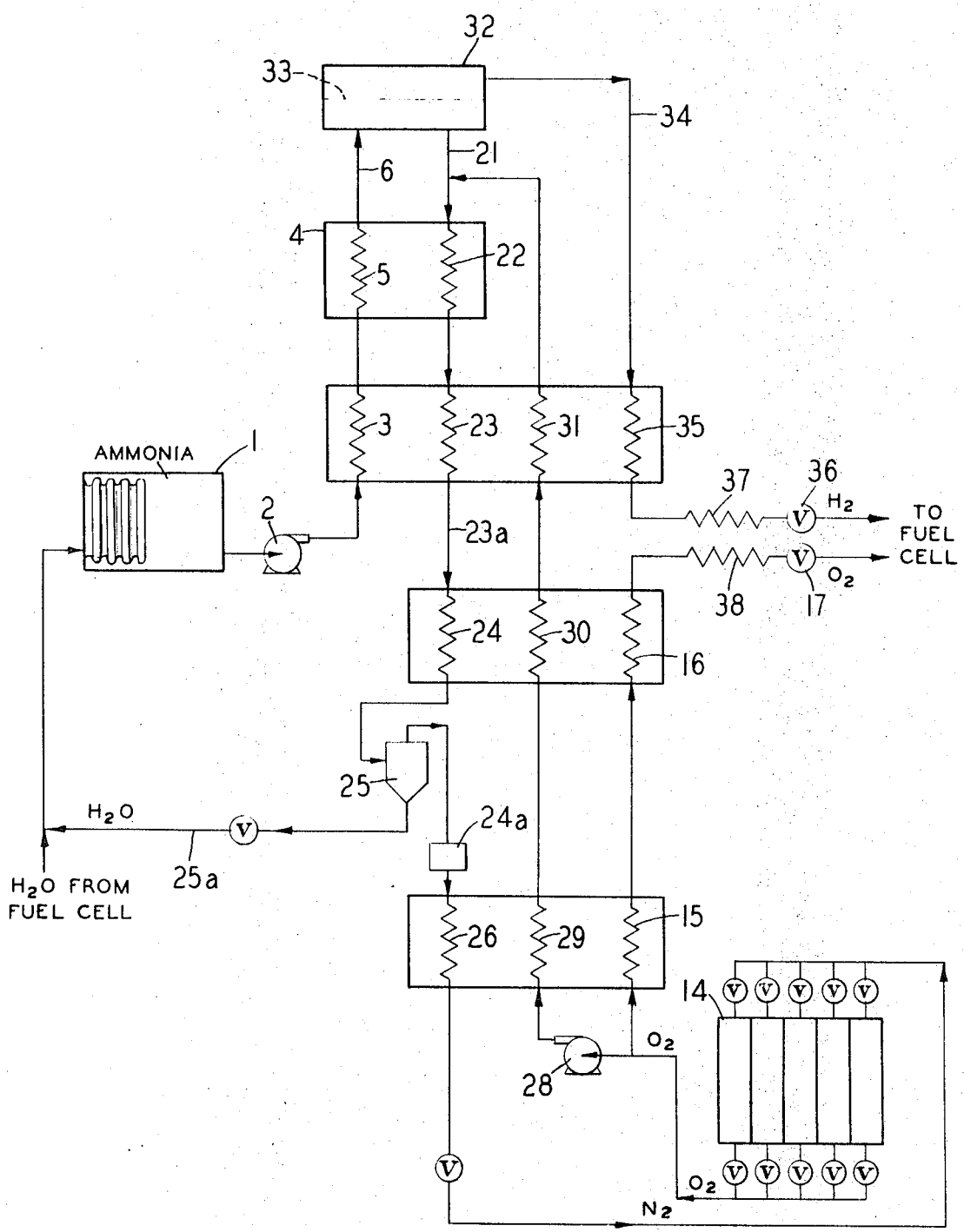
Figure 3:
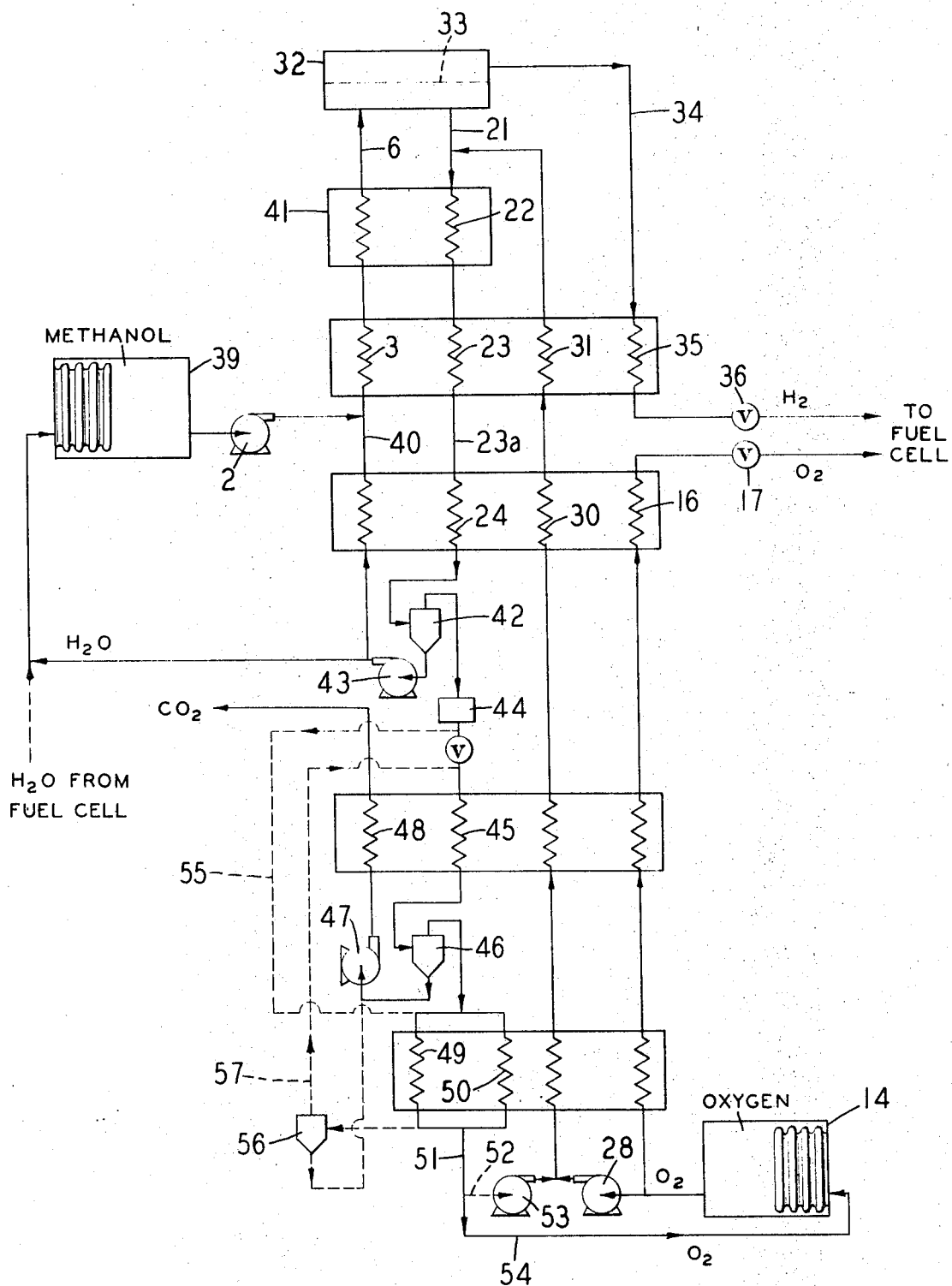

In the drawings:

FIGS. 1, 2, and 3 are schematic flow diagrams of three representative embodiments of the process of this invention.

The process of this invention comprises the steps of: providing separate supplies of liquid oxygen and a hydrogen-containing compound which on decomposition produces hydrogen gas; decomposing the hydrogen-containing compound to produce a mixture containing hydrogen gas; separating the decomposition product mixture into a residual product fraction and a higher purity hydrogen fraction; supplying this higher purity hydrogen fraction to a fuel cell; supplying oxygen gas to this fuel cell; oxidizing hydrogen and other oxidizable components in the waste gas stream from the fuel cell fuel electrode and/or in the residual product fraction by means of oxygen obtained from the oxygen supply; and utilizing the heat produced by this oxidation to assist in the decomposition of the hydrogen-containing compound.

In a preferred embodiment of the process of this invention, the products resulting from decomposition of the hydrogen-containing compound and/or contained in the fuel electrode waste gas stream are disposed of by employing both the refrigeration value and the oxidizing capacity of the liquid oxygen supply. That is, condensable impurities are liquefied by means of the refrigeration value in the liquid oxygen while oxidizable impurities are oxidized by means of the oxygen, and the heat released during oxidation used to supply at least part of the heat required to decompose the hydrogen-containing compound.

In another preferred embodiment of the process of this invention an extremely pure hydrogen stream is obtained by permeation, that is, by catalytically decomposing the hydrogen-containing compound and then separating the hydrogen from the by-products by selective permeation. For example, hydrogen gas will permeate selectively through a palladium-silver membrane. In this embodiment a waste or vent gas stream from the fuel cell is unnecessary, since the high purity hydrogen can be supplied to the fuel electrode in the exact quantity required by the power demand on the fuel cell. However, even with extremely high purity hydrogen it is often desirable to purge or vent the fuel electrode system occasionally, and the hydrogen vent or purge stream can be oxidized and disposed of as described above.

In still another preferred embodiment of the process of this invention, by-product materials which are disposed of by condensation using the refrigeration in the liquid oxygen source are stored within the liquid oxygen or hydrogen-containing compound storage tanks, utilizing the space made available by withdrawal of hydrogen-containing compound and/or oxygen for use in the process of this invention and in the fuel cell.

The hydrogen-containing compound can be any material which on decomposition produces hydrogen gas, and the term decomposition as used herein includes thermal dissociation, either catalyzed or uncatalyzed, and steam reforming. Compounds suitable for producing hydrogen by dissociation include ammonia and hydrazine. Almost any compound containing carbon and hydrogen can be steam reformed to produce crude hydrogen. Particularly suitable compounds for the practice of this invention include lower alcohols such as methanol, ethanol, propanols, butanols, etc., low molecular weight aliphatic hydrocarbons such as methane, ethane, propane, butane, etc. and even commercial hydrocarbon fuels such as gasoline, kerosene, and the like.

Several specific embodiments of the process of this invention, including illustrative methods and means for decomposition of the hydrogen-containing compound and methods and means for separating hydrogen from the initial decomposition product mixture, will now be described with reference to the drawings.

Referring to FIG. 1, anhydrous liquid ammonia ($NH_3$) is stored in tank 1 at ambient temperature and about 10 atmospheres. Liquid ammonia withdrawn from tank 1 (e.g. 100 mols per hr.) is pumped at 2 to about 19.2 atm., and vaporized and heated to about 780° F. in heat exchange passage 3. The hot ammonia then passes to ammonia dissociator 4 where it contacts a dissociation catalyst such as nickel or iron oxide. The ammonia is thus decomposed to nitrogen and hydrogen according to the equation $2NH_3 \rightarrow N_2 + 3H_2$. This reaction is endothermic and the required heat is added via passage 22 to maintain a dissociator temperature of about 800° F.

The dissociated gas stream 6, which is also called herein the crude hydrogen stream, is cooled to near-ambient temperature in heat exchanger passage 7, thermally associated with passage 3. It is then further cooled in heat exchanger passage 8 to a temperature preferably about 35° F. to condense its minor content (e.g. 5%) of undissociated ammonia. Condensed ammonia is separated at 9 and returned either to storage tank 1 or directly to the inlet of pump 2 for recirculation.

The gas stream, now predominantly hydrogen and nitrogen and still at about 19 atm. pressure is still further cooled in passage 10 to about −250° F. whereupon the bulk of the nitrogen is condensed (e.g. 31.5 mols/hr.), separated at 11 and withdrawn at 12. Uncondensed hydrogen (e.g. 158.5 mols/hr.) of about 90% purity suitable for delivery to the fuel cell is withdrawn and throttled to a slight positive pressure at 13. The product hydrogen stream 13a may be returned through the heat exchangers in separate passages (not shown) for delivery at ambient temperature, although normally the recovery of its refrigeration value is not necessary to balance the cycle. Alternatively, the refrigeration value of the hydrogen may be used for external purposes or discarded to the atmosphere.

Rerigeration for cooling the crude hydrogen stream to condense nitrogen and undissociated ammonia is provided by liquid oxygen (e.g. 56.4 mols/hr.) which is withdrawn from storage tank 14 at a slight positive pressure and vaporized and superheated in passages 15 and 16 countercurrent to the crude hydrogen in passages 10 and 8. The gaseous oxygen at near-ambient temperature passes to the fuel cell through flow regulator 17.

In the fuel cell hydrogen and oxygen are combined to form water. Since the hydrogen contains appreciable quantities of nitrogen, the flow of hydrogen cannot be dead-ended at the fuel cell, because nitrogen would tend to accumulate in the fuel cell as an inert gas and reduce its voltage. Nitrogen accumulation is controlled by continually venting or purging the cell. This purge stream may contain, for example, 65% uncombined hydrogen, and its disposition to the atmosphere can pose problems of economy and safety. In FIG. 1, the purge or vent stream 18 from the fuel cell is conveniently and economically utilized to provide heat necessary for operation of dissociator 4. After compression to about 6.1 atmospheres in compressor 19, the purge gas is heated in heat exchanger passage 20 to about 780° F. and is oxidized by a small quantity of oxygen (e.g. 15 mols/hr.) in passage 22 of the dissociator. A slight excess of oxygen is preferably used to ensure complete oxidation of the hydrogen content. Because the hydrogen in the purge stream is totally converted to water, all components of the oxidized purge stream ($N_2$, $H_2O$, and $O_2$) can be condensed at temperature levels existing in the cycle. The oxidized purge stream is cooled in passage 23, and is further cooled to about 35° F. in passage 24 to condense water which is separated and withdrawn at 25. Preferably an adsorbent trap 24a is interposed in the gas stream to remove residual water not condensed in passage 24. Continued cooling in passage 26 affects total condensation of the nitrogen and oxygen.

Oxidation of the waste or purge stream in passage 22 can be accomplished by high-temperature (flame) combustion. Alternatively, it can be accomplished catalytically at lower temperature. Catalysts suitable for this purpose are generally known; examples of such catalysts are oxides of manganese (ous) and bismuth, and metallic palladium or platinum. Any use herein of the term "burning" or "combustion" with reference to the oxidation of the purge or waste stream is intended to include either high temperature (flame) combustion or catalytic oxidation.

Oxygen for burning the uncombined hydrogen is withdrawn from tank 14, pumped at 28 to about 6.1 atmospheres, and is vaporized and superheated in passages 29, 30 and 31. It is preferable to vaporize and superheat this minor oxygen stream in passages separate from 15 and 16 because of the difference in pressure levels of the two oxygen streams. The major stream which flows to the cell through passages 15 and 16 must be vaporized at relatively low pressure in order to condense as much nitrogen as possible in passage 10. The minor oxygen stream flowing to the dissociator through passages 29 and 30 is preferably liquid-pumped to higher pressure sufficient for its introduction into the compressed purge stream. The alternative of compressing a part of the oxygen gas from passage 16 into passage 31 would consume more power and would be more expensive.

If the fuel cell purge stream 18 contains more than enough heating value to operate the dissociator, a portion of the purge can be diverted through line 18a to join stream 7a. Further compresion (means not shown) will be needed to reach the 19 atm. pressure of stream 7a. The nitrogen in the diverted portion is thereby condensed in passage 10 and the hydrogen is recirculated with the product hydrogen 13a to the fuel cell.

The condensed liquid nitrogen stream 12 may be vaporized and superheated in separate passages (not shown) in the heat exchangers, but its refrigeration value is not normally required to balance the cycle.

In some uses of the system, disposition of the nitrogen may present a problem, for example in orbital space vehicles where the ejection of mass from the vehicle will alter its course or performance and is to be avoided. The present invention provides a unique method of disposition which avoids such problems. Since its refrigeration value need not be recovered the waste nitrogen streams 12 and 27 can be left in liquid form and stored compactly in an insulated vessel for later discard or recovery of refrigeration value. Preferably, the liquid nitrogen is stored in one or more compartments of the liquid oxygen tank 14, and progressively occupies space vacated by consumed oxygen. The volume of liquid nitrogen produced in a given period of operation is less than the volume of oxygen consumed so that adequate storage space is available.

A compartment in tank 14 used to store nitrogen can be one of several rigid fluid-tight compartments comprising the total low-temperature insulated storage volume as shown schematically in FIG. 2. Alternatively, tank 14 can contain an expansible compartment or bladder which is initially empty and collapsed, and is progressively expanded and filled with liquid, as shown schematically in FIG. 1.

Similarly waste water 25a produced by combustion of purge hydrogen and also the water produced in the fuel cell can be stored for later use or discarded in one or more empty compartments in tank 1, thus utilizing space vacated by consumed ammonia.

Thus, the entire system can be made to function with constant mass and without extra storage space for waste products. It should be noted that compact storage of all waste products in liquid form is not feasible unless the hydrogen in stream 23a is completely burned.

FIG. 2 shows another hydrogen generation cycle which contains several additional advantages. While the cycle of FIG. 1 separated hydrogen from the crude stream by partial condensation of impurities, the cycle of FIG. 2 effects the separation by selective permeation of hydrogen.

The crude stream 6 from the ammonia dissociator 4 enters hydrogen permeator 32 which contains a hydrogen-permeable membrance 33 of material such as palladium or palladium alloy. A high-pressure difference is maintained across the membrane, and the major portion of the hydrogen (80–85%) permeates through the membrane and is withdrawn in pure form in line 34. It is cooled to near-ambient temperature in passage 35 and is delivered to the fuel cell through control valve 36. Unpermeated or purged gas from the permeator contains appreciable hydrogen (e.g. 25%), and its disposition poses the same problems which exist for the fuel cell purge or vent stream in the cycle of FIG. 1. The permeator purge gas stream 21 is employed advantageously to provide the requisite heat for the dissociator 4 by combustion with a small amount of oxygen.

The product hydrogen stream 34 contains at most only a few parts per million impurities, and it can be introduced into the fuel cell in stoichiometric proportion to the oxygen. It is not necessary to purge the cell continuously, and a purge or vent stream equivalent to stream 18 of FIG. 1 is not essential or generally required.

Construction and operation of permeation units is well known, and the process of this invention is not dependent upon any specific design of such units. U.S. Pat. 2,961,062, J. B. Hunter et al, illustrates a suitable construction employing capillary tubes of palladium-bearing metal. Other examples of permeator construction are U.S. Pat. 2,930,754, Stuckey, which employs organic films supported on screen, and U.S. 2,958,301, DeRosset, which employs hydrogen-permeable metal membranes supported on a porous matrix of sintered metal.

In either FIG. 1 or FIG. 2, the oxygen and hydrogen streams to the fuel cell may, if desired, be heat exchanged cocurrently to approximately equal temperatures so as to avoid thermal shock on the fuel cell. This is the purpose of passages 37 and 38 of FIG. 2.

Furthermore, in the cycles of both FIGS. 1 and 2, pump 2 is not essential. The vapor pressure of liquid ammonia is about 10 atmospheres at 70° F., which pressure is sufficient to obtain an operable, though somewhat less efficient, cycle. Pressures higher than 10 atmospheres can be obtained without pump 2 by adding a warming coil in tank 1. Heat for this purpose may be obtained electrically or by diverting a small fraction of a hot gas stream through the warming coil. For 19 atmospheres vapor pressure, a liquid ammonia temperature of about 115° F. is needed and tank 1 may require insulation to conserve heat.

The cycle of FIG. 2 has several important advantages over the cycle of FIG. 1 Mechanically, the equipment of FIG. 2 is simplified and reduced in cost by removal of one passage from each of the three heat exchangers. The expensive, heavy purge gas compressor 19 is also eliminated, and both construction and operation of the fuel cell is simpler and cheaper due to the higher purity and smaller volume of the hydrogen product. Process-wise the nitrogen separation step required in FIG. 1 (items 10 and 12) is eliminated. The fuel cell operates at higher and steadier voltage by virtue of the high-purity hydrogen fuel gas.

Ammonia is the preferred hydrogen-source material because its dissociation yields only nitrogen impurity which can be handled easily in the low-temperature equipment without solids deposition. However, certain features and advantages of the invention are also applicable when other hydrogen-source materials such as hydrocarbons or alcohols are employed. For example, FIG. 3 shows a cycle which employs methanol as the hydrogen-containing compound.

In FIG. 3, methanol (100 mols/hr.) is withdrawn from tank 39, pumped to 30.6 atm. at 2, and admixed with water at 40. The water, from a source later described, is admixed in at least 1:1 mol ratio with the methanol and preferably in 1.5:1 mol ratio. The mixture is vaporized and heated to 660° F. in passage 3 and is introduced into steam reformer 41 where it contacts a catalyst such as nickel or chromium oxide. The reforming reaction produces mainly carbon dioxide and hydrogen together with a small amount of carbon monoxide (e.g. 14%). The resulting stream 6 also contains a fraction of a percent unreacted methanol (e.g. .04%) together with any excess steam employed.

Stream 6 is introduced into permeator 32 and the majority of the hydrogen, e.g. 70%, is separated and withdrawn in pure form through line 34 for delivery to the fuel cell as in FIG. 2. The permeator purge stream 21 typically contains about 35% hydrogen and presents the disposal problem previously mentioned. The heating value of this purge stream is advantageouly used to supply the heat needed to operate reformer 41 by oxidizing its content of hydrogen, methanol, and carbon monoxide with a small quantity of oxygen from tank 14.

The products of oxidation are cooled in passages 23 and 24 to condense water which is withdrawn at separator 42. At least a portion of this water is pumped to 30.6 atm. pressure at 43 and is admixed with the methanol in prepartion for the previously described reforming step. The remainder of the water together with that produced in the fuel cell may be discarded or stored in one or more compartments in tank 39 progressively emptied of methanol.

It is advantageous to admix the water and methanol in the liquid state prior to vaporization because their binary mixture vaporizes at smoothly increasing temperatures in passage 3. This provides a much more efficient $\Delta_T$ pattern for the heat exchange between passages 3 and 23.

Residual water vapor remaining after condensation in passage 24 may be removed by adsorption in trap 44 to avoid freezing at lower temperatures. The dry products of combustion ($CO_2$, $O_2$) are further cooled in passage 45 to a temperature sufficiently low to condense liquid but not solid carbon dioxide, e.g. colder than $+23°$ F. and warmer than $-70°$ F. when the pressure is about 30 atm. Preferably, the stream is cooled to near the low end of this range to effect substantially complete condensation of carbon dioxide. At pressures greater than about 5 atmospheres carbon dioxide condenses as a liquid. The condensed liquid carbon dioxide is separated at 46.

The refrigeration value of the relatively large stream of liquid carbon dioxide is needed to balance the cycle thermally. The recovery of this refrigeration is accomplished in this embodiment of the invention by revaporization in passage 48 to help condense the carbon dioxide in passage 45. If desired, smooth liquid flow into passage 48 can be assured by pump 47.

The small remainder of the waste stream, now almost wholly oxygen, is totally condensed in one of alternate passages 49 and 50 and is withdrawn in line 51. At least a portion of this stream may be repressurized for use in oxidizing the combustibles in the permeator purge stream, and thereby reduce the consumption of pure oxygen from tank 14 for this purpose. Line 52 and pump 53 are included to accomplish this recirculation of oxygen in the waste stream. The recondensed oxygen in line 51 contains trace amounts of impurities which preferably are not introduced into the fuel cell. Therefore, condensed oxygen in line 54 not used as oxidant for the purge stream, can be stored in one or more compartments in tank 14 separate from higher purity oxygen used in the fuel cell. Alternatively, stream 51 or 54 may be repurified as by adsorption (means not shown) to a degree of purity suitable for remixing with pure oxygen for the cell.

The gas stream from separator 46 contains traces of residual, uncondensed carbon dioxide which freezes out at lower temperatures. Passages 49 and 50 are therefore alternately removed from service and thawed. For thawing, a minor portion of the dry, relatively warm stream of combustion products may be diverted after trap 44 and directed through line 55 to the contaminated passage 49 or 50. The thaw stream carrying melted carbon dioxide is separated at 56 and the gas is recirculated through line 57 to the point of diversion. Separated liquid carbon dioxide joins liquid separated in 46 for revaporization in passage 48.

The relatively warm, gaseous carbon dioxide leaving passage 48 may be disposed of in any suitable manner, for example by chemical absorption in caustic solution (aqueous sodium hydroxide or potassium hydroxide).

In all the described embodiments, power needed to operate pumps, compressors, and control equipment usually constitutes a minor portion of the power generated by the fuel cell. The power consumed to operate the process should be minimized, since the overall efficiency of the system is determined at least in part by the net power output. Gas compression requires considerable power, and this further emphasizes an advantage of the cycles of FIGS. 2 and 3 since they do not contain gas compressors.

The need to conserve power also emphasizes an advantage of utilizing the heating value of a waste stream to operate the hydrogen-containing compound dissociator. This is far more preferable than operating with electric heaters or by burning raw fuel as has been customary heretofore.

A feature common to all embodiments of this invention is the production ratio of hydrogen and oxygen. In order to effect disposition by condensation of all waste and by-products ultimately produced in the dissociation processes of FIGS. 1 and 2, it is necessary that the total production of free hydrogen be in approximate stoichiometric proportion to the consumption of oxygen. In other words, the hydrogen in crude stream 6 is in stoichiometric proportion to the oxygen withdrawn from tank 14. It is an advantage of this invention that the refrigeration in this quantity of oxygen is approximately that which is needed to condense the by-products and to balance the cycle thermally. It is a further advantage of the invention that when the product hydrogen is pure (e.g. when a permeator is used), the oxygen and hydrogen products delivered by the process are in approximate stoichiometric proportion.

It is still another advantage of all embodiments of this invention that a purge stream containing hydrogen is produced, and its heating value is utilized to help decompose the hydrogen-bearing compound. This purge stream can be produced within the generator itself (for example, when a permeator is used as in FIGS. 2 and 3), or it can be produced in the consuming system as in FIG. 1.

What is claimed is:

1. A process for operating a hydrogen-oxygen fuel cell (wherein hydrogen and oxygen react at separate electrodes with production of electrical energy and the formation of water) in a closed system which comprises employing separate supplies (a) of liquid oxygen from which gaseous oxygen is vaporized and supplied to the oxygen electrode of said fuel cell and (b) of a liquid hydrogen-containing compound which on decomposition produces hydrogen gas; decomposing said compound to produce a decomposition product mixture containing hydrogen gas; removing condensible vapors from said decomposition product mixtures by means of the refrigeration value of said liquid oxygen to provide a higher purity hydrogen fraction; supplying hydrogen from said higher purity fraction to the hydrogen electrode of said fuel cell; vaporizing and supplying said oxygen gas from said liquid oxygen supply to the oxygen electrode of said fuel cell; reacting hydrogen and oxygen in said fuel cell to produce electrical energy and water vapor oxidizing hydrogen and other oxidizable components in the waste gas stream from said hydrogen electrode by means of oxygen obtained from said oxygen supply; utilizing at least a part of the heat produced by said oxidation to supply at least a part of the heat requirements of the decomposition of said hydrogen-containing compound; condensing condensible vapor products from said oxidation step by means of the refrigeration value of said liquid oxygen; and storing condensed vapors from said decomposition product mixture in space vacated by withdrawal of said liquid oxygen and storing the condensed vapors from the oxidation step and condensed water vapor from said fuel cell in space vacated by withdrawal of said liquid hydrogen-containing compound.

2. A process in accordance with claim 1 wherein said hydrogen-containing compound is an alcohol, ammonia or hydrazine.

References Cited

UNITED STATES PATENTS

| | | | |
|---|---|---|---|
| 2,384,463 | 9/1945 | Gunn et al. | 136—86 |
| 3,179,500 | 4/1965 | Bowden et al. | |
| 3,278,268 | 10/1966 | Pfefferle. | |
| 3,352,716 | 11/1967 | Lindstrom | 136—86 |
| 3,288,646 | 11/1966 | Soredal | 136—86 |

OTHER REFERENCES

Geissler "Compact $H_2$ Generators for Fuel Cells" Proceedings 17th Annual Power Sources Conference May 1963, pp. 75–77.

WINSTON A. DOUGLAS, Primary Examiner

M. J. ANDREWS, Assistant Examiner